No. 11,766. Reissued Aug. 22, 1899.

D. B. SHANTZ.

LATHE FOR TURNING BUTTONS.

(Application filed Apr. 5, 1899.)

2 Sheets—Sheet 1.

Witnesses:
F. L. Ourand.
Esther V. Pyng.

Inventor:
Dilman B. Shantz
by Louis Sagyer & Co.
Attorneys.

No. 11,766. Reissued Aug. 22, 1899.

D. B. SHANTZ.

LATHE FOR TURNING BUTTONS.

(Application filed Apr. 5, 1899.)

2 Sheets—Sheet 2.

Witnesses:
F. L. Durand.
Esther V. Byng.

Inventor;
Dilman B. Shantz,
by Louis Bagger & Co.,
Attorneys.

UNITED STATES PATENT OFFICE.

DILMAN B. SHANTZ, OF BERLIN, CANADA.

LATHE FOR TURNING BUTTONS.

SPECIFICATION forming part of Reissued Letters Patent No. 11,766, dated August 22, 1899.

Original No. 431,956, dated July 8, 1890. Application for reissue filed April 5, 1899. Serial No. 712,037.

*To all whom it may concern:*

Be it known that I, DILMAN B. SHANTZ, a subject of the Queen of Great Britain, and a resident of Berlin, in the Province of Ontario and Dominion of Canada, have invented certain new and useful Improvements in Lathes for Turning Buttons; and I do hereby declare that the following is a full, clear, and exact description of the invention, which will enable others skilled in the art to which it appertains to make and use the same.

My invention relates to machines for turning buttons; and it consists in the novel features of construction and new combinations of parts hereinafter fully described and specifically pointed out in the claims.

Figure 1:
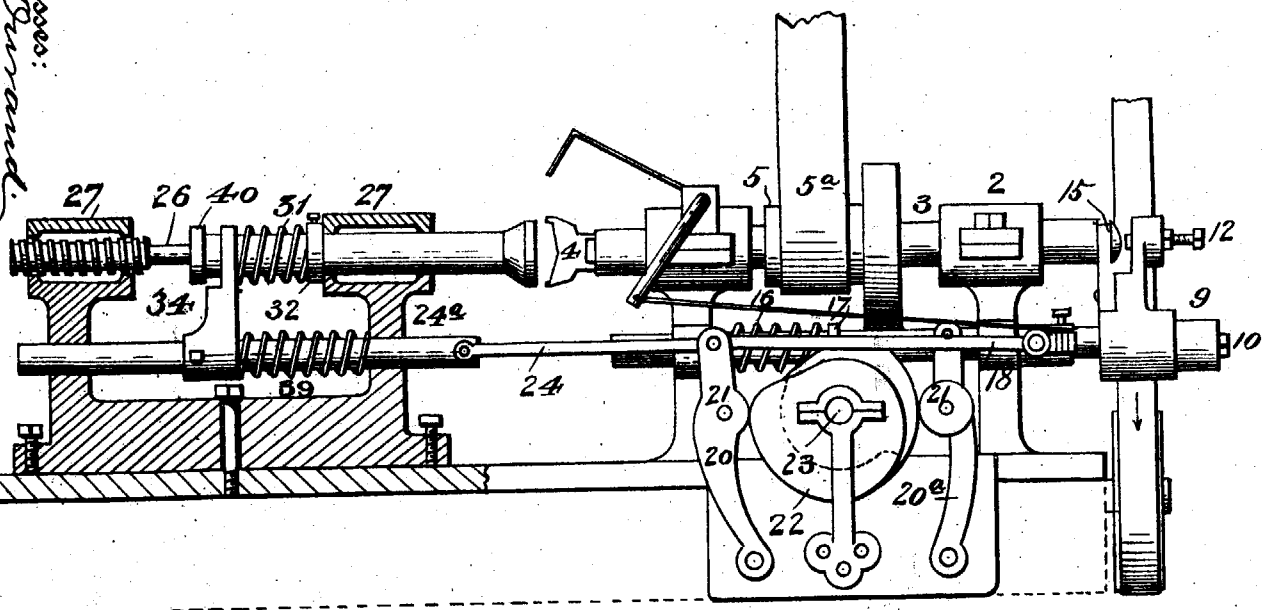
Figure 2:
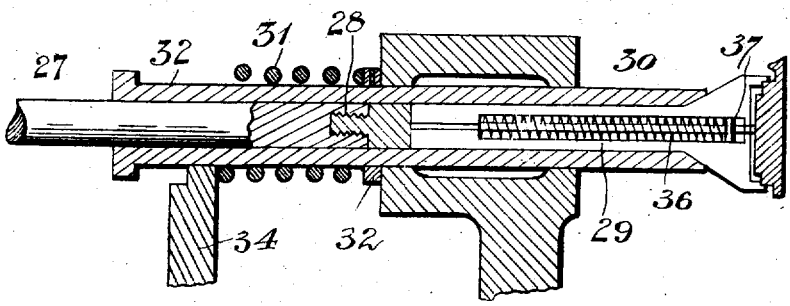
Figure 3:
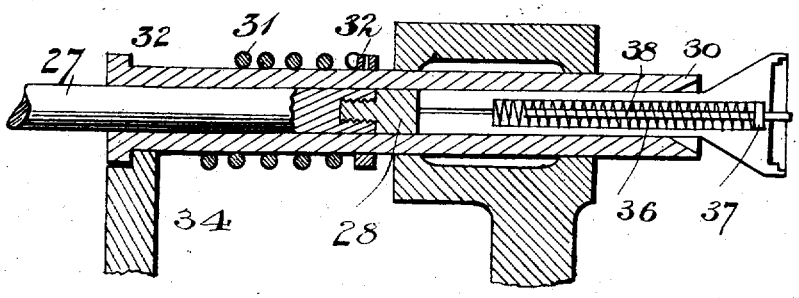
Figure 4:
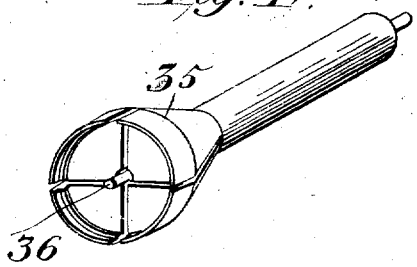

In the accompanying drawings, Figure 1 is a side elevation of a lathe for turning buttons with my improvements applied thereto. Fig. 2 is a longitudinal section of the mandrel and chuck on an enlarged scale, with a piece of material or button-blank clamped by the chuck. Fig. 3 is a similar view showing the material discharged. Fig. 4 is a perspective view of the chuck.

In the said drawings the reference-numeral 1 indicates the bed or frame of the machine, and 2 2 are the head-stocks secured thereto, which carry the revolving mandrel 3, having the cutter 4. This mandrel is rotated by means of pulley 5 and belt 5[a] and is also given a longitudinal motion by slide-rod 6. This slide-rod is connected with the mandrel by bracket 8, secured to said rod by caps 9 and set-screws 10 and is adjustably placed against the end of the mandrel by a tail-screw 12 passing into the head of said bracket. A forked bracket 15 holds the mandrel. A spring 16, coiled upon rod 5, is placed between the inner face of the inner bearing of the head-stock and a collar 17, the tendency of said spring being to draw the slide-rod away from the center of the lathe, so as to retract the cutting-tool. The said slide-rod is connected with a rod 18, pivoted to a lever 20, provided with friction-bowl 21, said lever being operated by a cam 22, mounted on the transverse shaft 23. A similar lever 20[a], provided with friction-bowl 21, is connected with a rod 24, connected with slide-rod 24[a], which actuates the chuck to grip and release the button-blank. This lever is operated by a cam 25 on the shaft 23.

The construction so far described forms no part of my present invention, which relates to the stationary mandrel and chuck for holding the button-blank while being operated upon by the cutter. The stationary mandrel 26 is mounted in the head-stocks 27 and is provided with a tailpiece 28, to which is attached a piece 29, partially hollow and split into four quarters to form spring-jaws tending to spring outwardly, a sleeve 30 sliding upon the tailpiece 28 and in the head-stock by the forward movement of the bracket 34, connected to the rods 24 and 24[a], and thus by the spring 31 and collar 32 pressing the sleeve 30 firmly against the spread-jaws of the chuck-piece 29 and by means of the rim or lip 35 on piece 29 will firmly grasp the blank and hold it until formed into a completed button by the revolving cutter acting on the opposite side. The thin rod 36, with the collar 37 and the coiled spring 38, is so placed in the piece 29 as to assist in discharging the blank when the spring-jaws are allowed to spread apart on the rearward movement of the sleeve 30 by pressure of a coiled spring 39, placed upon the rod 24[a] between the bracket and the head-stock and the cam 25, connected by the lever 20[a] with the rods 24 and 24[a], to force the bracket 34 against the collar 40 on sleeve 30.

Having thus described my invention, what I claim is—

1. In a lathe for turning buttons the combination with the stationary mandrel provided with tailpieces 28, the piece 29, partially hollow and split into four quarters, the rod 36, collar 37 and coiled spring 38, of the sleeve 30 having collars 32 and 40, the coiled spring 31, and the bracket 34, substantially as described.

2. In a lathe for turning buttons the combination with the stationary mandrel provided with tailpieces 28, the piece 29, partially hollow and split into four quarters, the rod 36, collar 37 and coiled spring 38, of the sleeve 30, having collars 32 and 40, the coiled spring 31, the bracket 34, the rods 24 and 24[a], and the coiled spring 39, substantially as described.

3. In a lathe for turning buttons the combination with a stationary mandrel having a connected piece split into four quarters forming spring-jaws, of an encircling sleeve provided with collars, a coiled spring interposed between the collars, a reciprocating bracket engaging with said collars and mounted upon a cam-actuated rod and a coiled spring interposed between said bracket and the headstock of the machine, substantially as described.

In testimony that I claim the foregoing as my own I have hereunto affixed my signature in presence of two witnesses.

DILMAN B. SHANTZ.

Witnesses:

WM. F. FOLKS,

BENNETT S. JONES.